United States Patent
Wong et al.

(10) Patent No.: US 11,895,706 B2
(45) Date of Patent: Feb. 6, 2024

(54) METHODS, COMMUNICATIONS DEVICE AND INFRASTRUCTURE EQUIPMENT

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 506 days.

(21) Appl. No.: 17/276,158

(22) PCT Filed: Sep. 24, 2019

(86) PCT No.: PCT/EP2019/075723
§ 371 (c)(1),
(2) Date: Mar. 15, 2021

(87) PCT Pub. No.: WO2020/064739
PCT Pub. Date: Apr. 2, 2020

(65) Prior Publication Data
US 2021/0274563 A1    Sep. 2, 2021

(30) Foreign Application Priority Data
Sep. 28, 2018   (EP) ..................................... 18197768

(51) Int. Cl.
*H04W 74/08*       (2009.01)
*H04W 68/02*       (2009.01)

(52) U.S. Cl.
CPC ....... *H04W 74/0833* (2013.01); *H04W 68/02* (2013.01)

(58) Field of Classification Search
CPC .......................... H04W 74/0833; H04W 68/02
See application file for complete search history.

(56) References Cited

U.S. PATENT DOCUMENTS

2014/0126489 A1    5/2014  Zakrzewski
2018/0376422 A1*  12/2018  Shu ................... H04W 52/0235

FOREIGN PATENT DOCUMENTS

EP           3288317 A1     2/2018

OTHER PUBLICATIONS

International Search Report and Written Opinion dated Nov. 25, 2019, received for PCT Application PCT/EP2019/075723 Filed on Sep. 24, 2019, 10 pages.

(Continued)

*Primary Examiner* — Curtis B Odom
(74) *Attorney, Agent, or Firm* — XSENSUS LLP

(57) ABSTRACT

A method of operating a communications device for transmitting user plane data to a wireless communications network via a wireless access interface provided by a cell of the wireless communications network when the communications device is not in an active radio resource connected mode is provided. The method comprises transmitting the user plane data using one of a preconfigured set of uplink radio resources of the wireless access interface and a scheduled random access procedure message, and monitoring a preconfigured set of downlink radio resources of the wireless access interface for a downlink signal, the preconfigured set of downlink radio resources being provided in response to the transmitted user plane data.

20 Claims, 8 Drawing Sheets

(56) References Cited

OTHER PUBLICATIONS

Catt, "DL Small Data Transmission in Inactive State", 3GPP TSG-RAN WG2 Meeting #96, R2-167955, Nov. 14-18, 2016, pp. 1-3.

Huawei et al., "On Support for Transmission in Preconfigured UL Resources", 3GPP TSG RAN WG1 Meeting #94, R1-1808108, Aug. 20-24, 2018, 6 pages.

Ericsson, "Support for Transmission in Preconfigured UL Resources in NB-Iot", 3GPP TSG-RAN WG1 Meeting #94, R1-1808044, Aug. 20-24, 2018, pp. 1-5.

Ericsson, "Revised WID for Further Enhanced MTC for LTE", 3GPP TSG RAN Meeting #73, RP-161464, Sep. 19-22, 2016, 6 pages.

Huawei et al., "Revised Work Item Proposal: Enhancements of NB-Iot", 3GPP TSG RAN Meeting #73, RP-161901, Sep. 19-22, 2016, 8 pages.

Ericsson, et al., "New WID on Even Further Enhanced MTC for LTE," 3GPP TSG RAN Meeting #75, RP-170732, Mar. 6-9, 2017, 4 pages.

Huawei et al., "New WID on Further NB-IoT Enhancements," #3GPP TSG RAN Meeting #75, RP-170852, Mar. 6-9, 2017, 6 pages.

Ericsson, "New WID on Rel-16 MTC Enhancements for LTE", 3GPP TSG RAN Meeting #80, RP-181450, Jun. 11-14, 2018, 4 pages.

Ericsson et al., "New WID on Rel-16 Enhancements for NB-Iot", 3GPP TSG RAN Meeting #80, RP-181451, Jun. 11-14, 2018, 4 pages.

Holma et al., "LTE for UMTS OFDMA and SC-FDMA Based Radio Access", Wiley and Sons, 2009, pp. 25-27.

ETSI, "Evolved Universal Terrestrial Radio Access (E-UTRA); User Equipment (UE) procedures in Idle Mode", 3GPP TS 36.304, Version13.0.0, Release 13, Feb. 2016, 44 pages.

ETSI, "Evolved Universal Terrestrial Radio Access (E-UTRA); Medium Access Control (MAC) Protocol Specification", 3GPP TS 36.321, Version 12.5.0, Release 12, Apr. 2015, 79 pages.

\* cited by examiner

METHODS, COMMUNICATIONS DEVICE AND INFRASTRUCTURE EQUIPMENT

CROSS-REFERENCE TO RELATED APPLICATIONS

The present application is based on PCT filing PCT/EP2019/075723, filed Sep. 24, 2019, which claims priority to EP 18197768.7, filed Sep. 28, 2018, the entire contents of each are incorporated herein by reference.

BACKGROUND

Field of Disclosure

The present disclosure relates to methods and various telecommunications apparatus for the communication of random access procedure messages.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. The IoT is further enhanced in 3GPP by the introduction of two additional Release 16 Work Items, namely A-MTC (Additional Machine Type Communications Enhancements) [5] and A-NB-IoT (Additional Enhancement for Narrowband Internet of Things) [6].

At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a method of operating a communications device for transmitting user plane data to a wireless communications network via a wireless access interface provided by a cell of the wireless communications network when the communications device is not in an active radio resource connected mode. The method comprises transmitting the user plane data using one of a preconfigured set of uplink radio resources of the wireless access interface and a scheduled random access procedure message, and monitoring a preconfigured set of downlink radio resources of the wireless access interface for a downlink signal, the preconfigured set of downlink radio resources being provided in response to the transmitted user plane data.

Embodiments of the present technique, which further relate to communications devices, infrastructure equipment, methods of operating infrastructure equipment and circuitry for communications devices and infrastructure equipment, allow for the efficient reception of an acknowledgement or a response message by a communications device from a network (e.g. from an infrastructure equipment forming part of that network) following the transmission of an uplink early data transmission or a data transmission using preconfigured uplink resources by the communications device to the network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
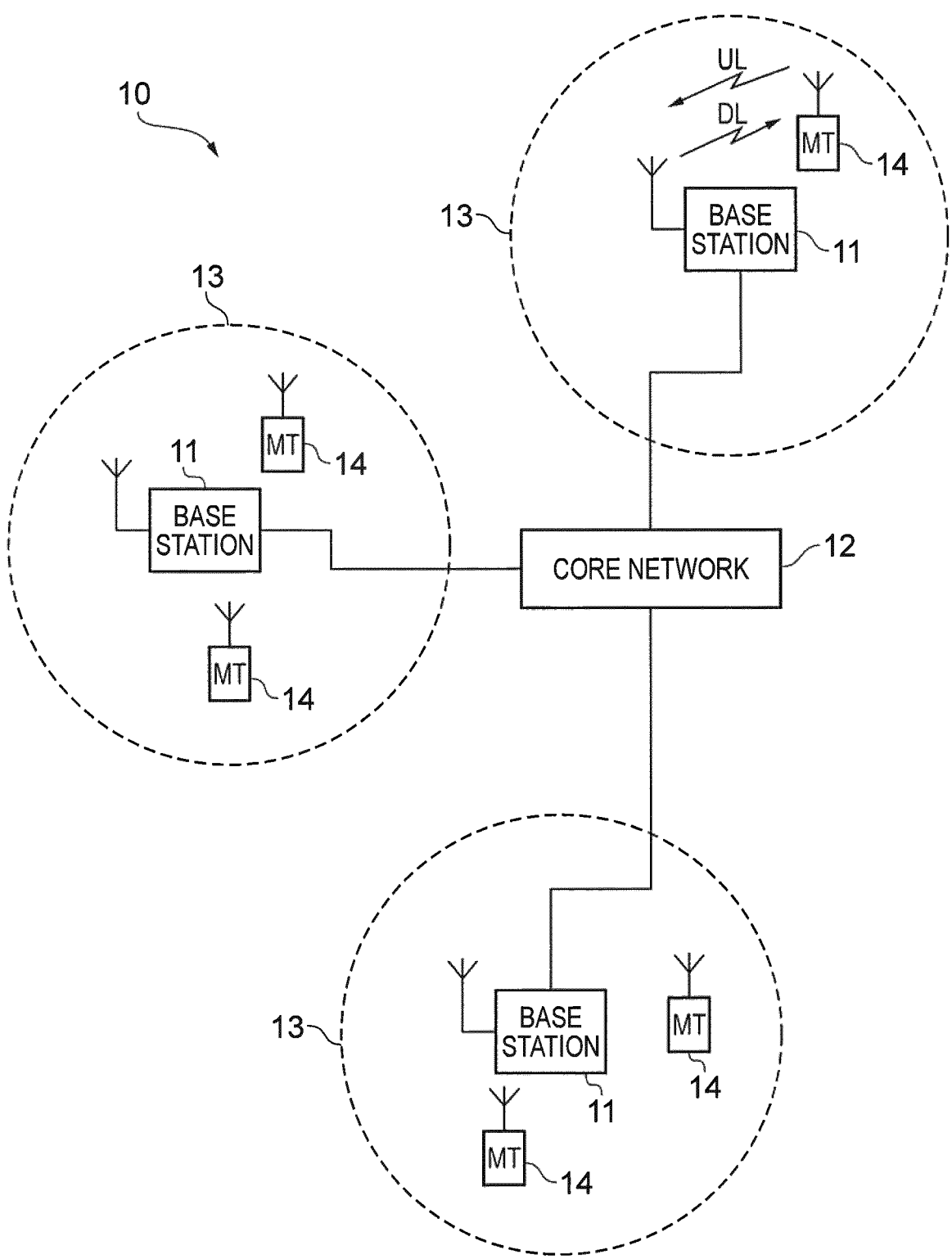
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [7]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:
Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms [4].

The elements of the wireless access network shown in FIG. 1 may be equally applied to a 5G new RAT configuration, except that a change in terminology may be applied as mentioned above.

Figure 2:
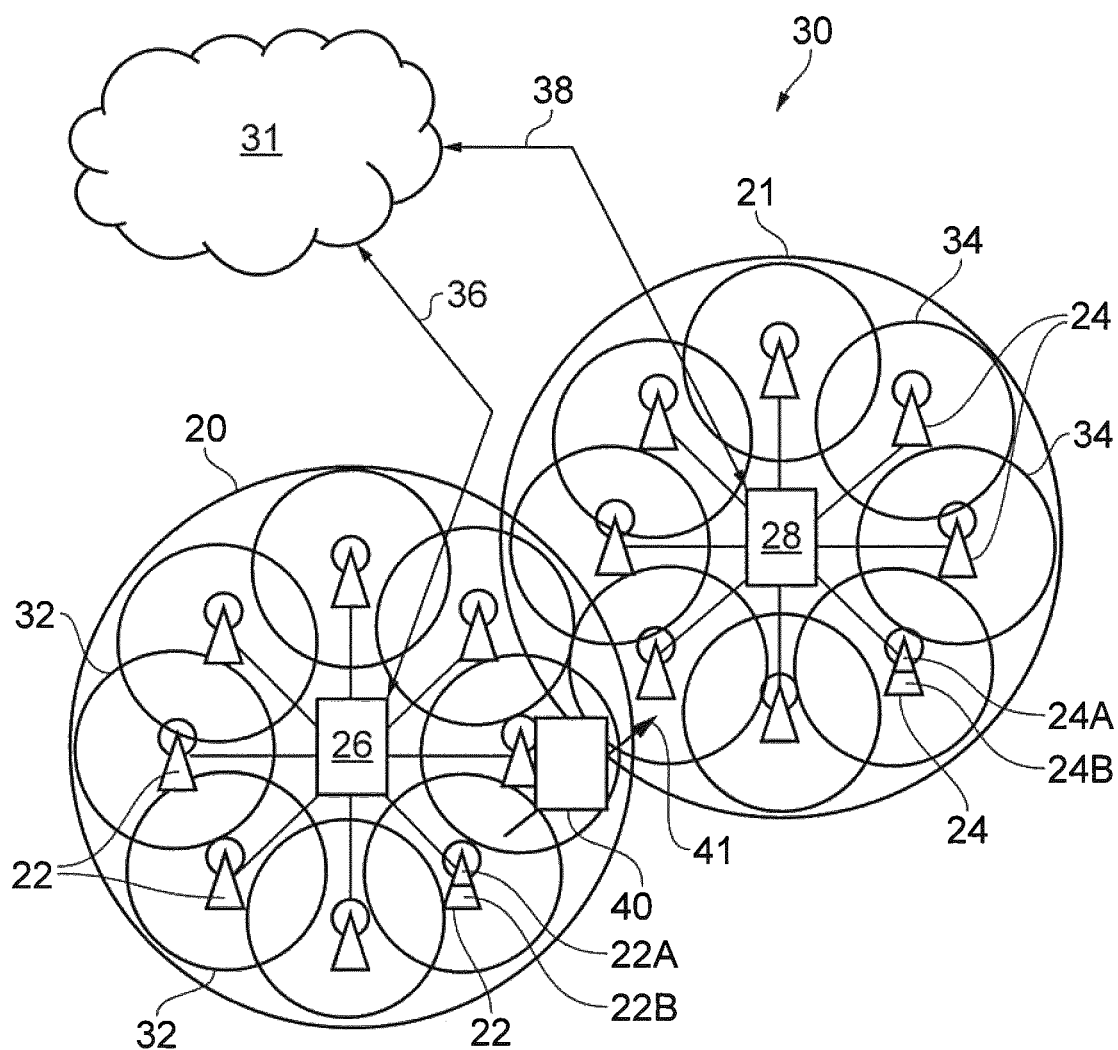
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 in a cell has a coverage area (radio access footprint) 32, 34, where the aggregation of the coverage areas of the distributed units 22, 24 defines the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) is involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

For a terminal device in RRC idle mode the core network is aware that the terminal device is present within the network, but the radio access network (RAN) part (comprising radio network infrastructure equipment such as the base stations 11 of FIG. 1 and/or the TRPs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used.

In a typical currently deployed network, idle mode terminal devices are configured to monitor for paging messages periodically. For terminal devices operating in a discontinuous reception (DRX) mode this occurs when they wake up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

In a conventional system, a terminal device thus receives and checks the contents of specific sub-frames (paging occasions) in specific frames (paging frames) to look for paging signalling. For example, in accordance with the standards set out in [8], a Paging Frame (PF) is a downlink radio frame which may contain one or more Paging Occasion(s) (PO), where a Paging Occasion is a sub-frame where there may be P-RNTI transmitted on PDCCH (or equivalent channel depending on implementation, e.g. on MPDCCH for MTC or for NB-IOT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by [9]). All terminal devices check whether PDCCH at specific PFs/POs configured for their use include P-RNTI or not. If there is a PDSCH allocation addressed to P-RNTI in the relevant subframe, the terminal device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of terminal devices, for example MTC devices, it may be expected the corresponding channel names may be modified. For example, a physical downlink control channel dedicated for MTC devices may be referred to as MPDCCH and a corresponding physical downlink shared channel for MTC devices may be referred to as PDSCH.

In proposed approaches for eNB-IoT and feMTC in accordance with 3GPP release 14, a terminal device in DRX in idle mode is required to decode PDCCH (or equivalent downlink control channel for the specific implementation at hand) to identify if there are resources scheduled on PDSCH (or equivalent downlink shared channel for the specific implementation at hand) for a paging message during paging occasions in which the terminal device might receive a paging message.

Figure 3:
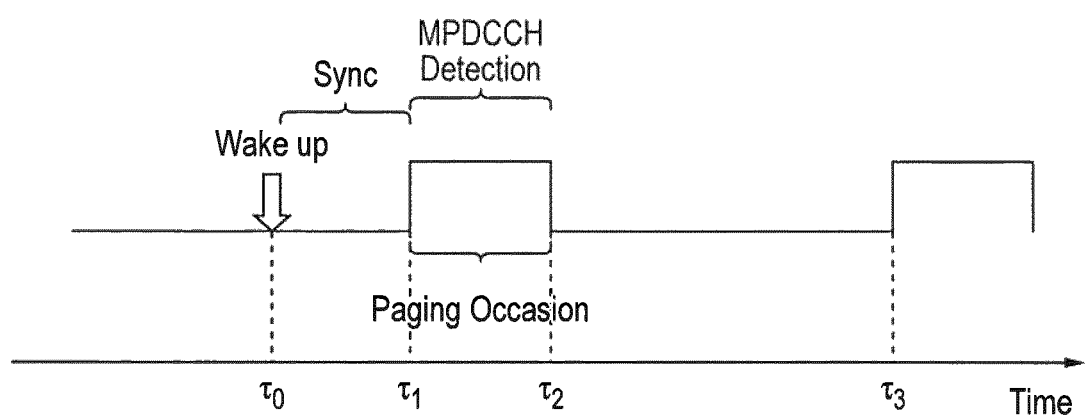
FIG. 3 schematically represents a time line associated with paging occasions in wireless telecommunication systems based on known approaches.

FIG. 3 schematically represents a timeline of a paging occasion for a terminal device operating in a known wireless telecommunications system. In the example shown in FIG. 3, one paging occasion is shown and extends from time t1 to t2. As is conventional, paging occasions for a terminal device will typically occur according to a regular repeating schedule having regard to the terminal device's currently configured DRX cycle. Different terminal devices may have different DRX cycle lengths, and so have different times between paging occasions. For a terminal device having a relatively long DRX cycle/time between paging occasions, it is possible the terminal device will to some extent lose synchronisation with the radio network infrastructure equipment of the telecommunications system between paging occasions. In this case it may be helpful for the terminal device to wake up in advance of the paging occasion to allow it to synchronise to the wireless telecommunications system prior to the paging occasion. An example of this is schematically shown in FIG. 3 in which the terminal device wakes up at time t0 so that it can synchronise with the wireless telecommunication system in the period between times t0 and t1 so that it is able to monitor/detect MPDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree of synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the terminal device may become significantly offset relative to that of the radio network infrastructure).

Once the terminal device has re-synchronised to the network, it will monitor MPDCCH to determine if there is a paging message, and if so will go on to decode the PDSCH carrying the paging message in the usual way. If there is no paging message for the terminal device, the terminal device will go back to sleep (low power mode) until the next paging occasion. For certain types of terminal devices, such as MTC devices, it may be expected that paging will occur relatively rarely (e.g. once per day for a smart utility meter).

Random Access (RACH) Procedure and Early Data Transmission (EDT)

As described above, in wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may move to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access preamble (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection. This can be particularly helpful for infrequent and short messages type of traffic, since EDT would reduce the high overhead for RRC signalling in establishing an RRC connection and performing an RRC disconnection.

One of the many uses for IoT is to provide infrequent reports and receive infrequent commands from the network, e.g. sensors and utility meters, and the IoT device (i.e. UE) is expected to be in power saving mode or long DRX most of the time to conserve battery power. Hence, when there is data to transmit or receive, due to the long DRX, the UE would need to reacquire synchronisation, update system information and connect to the network to perform the data exchange, which can take a long time and therefore consume a lot of battery power. Recognising this, one of the objectives for Rel-15 IoT (efeMTC and feNB-IoT) is to reduce the latency for data transmission, which consists of reducing system acquisition time (i.e. synchronisation and updating System Information) and enabling EDT.

Figure 4:
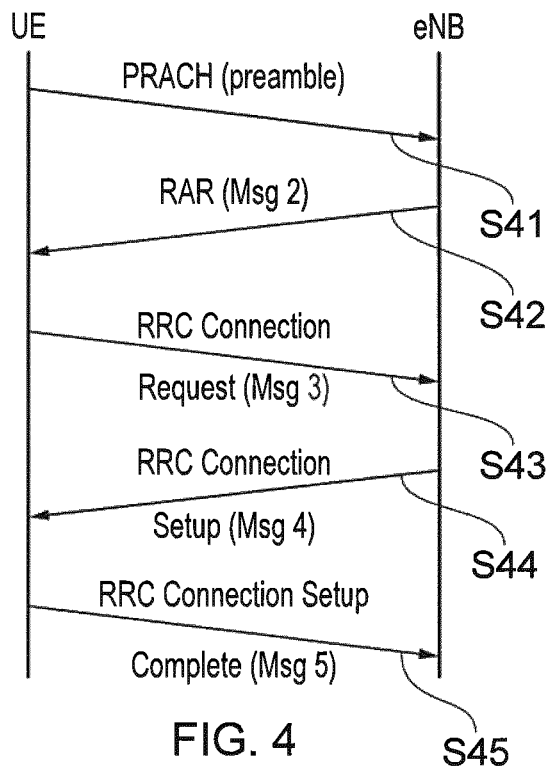
FIG. 4 schematically represents a first example random access procedure for use by different types of terminal device.

FIG. 4 is a ladder diagram that schematically shows message exchange between a UE and an eNodeB in a typical random access procedure to establish an RRC connection, in this example in an LTE-based network. The UE starts the process in step S41 by transmitting a random access request on a physical random access channel (PRACH in an LTE context), i.e. a random access preamble (RACH preamble), to the eNodeB. In step S42, when the eNodeB detects this preamble it will respond with a Random Access Response message (RAR), which is also known as Message 2. The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S41, and the RAR will indicate which preamble the eNodeB has detected and is responding to. It may be noted that it is possible that multiple UEs may transmit a random access request using the same PRACH preamble and in the same time and frequency resources. The RAR of step S42 also contains an uplink grant for the preamble the network is responding to so that the UE that transmitted the preamble may use this uplink grant to transmit an RRC Connection Request message, also known as Message 3 to the eNodeB, in step S43. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNodeB will respond to Message 3, in step S44, with Message 4 which carries an RRC Connection Setup message. For the case where multiple UEs use the same preamble, Message 4 provides contention resolution functionality, for example using a communications device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step S45 containing an RRC Connection Setup Complete message.

As described above, in Rel-15, Early Data Transmission (EDT) is introduced in the uplink, which allows the UE to transmit data to the network during the RRC connection process. In the message exchange shown in FIG. 4, the uplink EDT is transmitted using Message 3 and the UE can move back to idle mode after Message 4. This would avoid the need to establish an RRC connection, and hence reduces power consumption.

Figure 5:
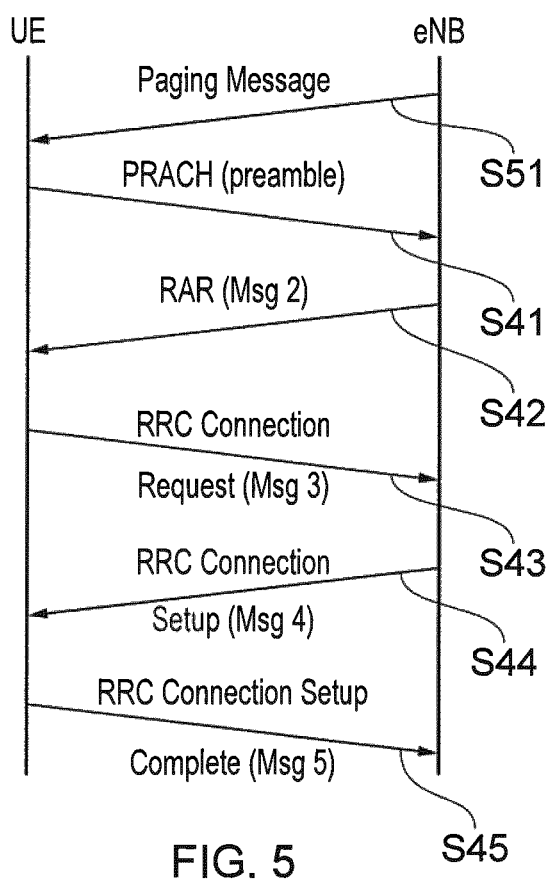
FIG. 5 schematically represents a second example random access procedure for use by different types of terminal device in response to a paging message.

In Rel-16 A-MTC and A-NB-IoT, EDT is further developed to include Mobile Terminated (MT) data, i.e. downlink EDT. Similarly to uplink EDT in Rel-15, downlink EDT can be used by the network to transmit data to the UE without the need to establish an RRC connection. For MT data, the network initiates the RRC connection process by paging the UE and this is followed by a Random Access procedure as shown in FIG. 5, which is similar to that in FIG. 4 but starts with a paging message S51 instead of a PRACH, which is transmitted by UE once it has been paged. Note that the sequence shown in FIG. 5 shows the standard procedure of sending downlink (DL) MT data to the UE without the EDT process. The following steps of FIG. 5 are substantially equivalent to steps S41 to S45 of FIG. 4.

Downlink EDT using Message 4 is concluded to be possible in Rel-15 without any specification impacts. Co-pending patent applications describe solutions related to transmitting Downlink EDT, both over the paging message in [10] and using Message 2 in [11], the contents of each of which are hereby incorporated by reference. It is proposed that a known preamble is transmitted from the UE to the network after receiving an EDT from the paging message in [10] or after receiving an EDT via message 2 in [11]. This known preamble would provide a layer 1 acknowledgement for the transmission.

Pre-Configured Uplink Resources (PUR)

One of the objectives of Release-16 for A-MTC is to specify support for transmitting signals in pre-configured uplink resources (PUR) in idle and/or connected mode based on a single carrier frequency division multiple access (SC-FDMA) waveform for UEs with a valid timing advance, with both shared resources and dedicated resources being considered. As those acquainted with LTE will appreciate, SC-FDMA is an example of a multiple access technique which is used to form a wireless access interface for up-link transmissions of UEs to a 3GPP LTE configured wireless communications network.

The concept of PURs, referred to above, is to provide communications resources of the wireless access interface in which a UE can transmit without receiving a grant just prior to transmitting on those resources. The PUR can form part of physical uplink shared channel resources (PUSCH). In conventional arrangements such as 3GPP Release-15, in order to use the PUSCH resources, the UE needs to be granted the use of those resources. The procedure for granting those resources can take one of several forms, the most likely of which are:

The UE sends a PRACH preamble to the eNodeB; or

The eNodeB calculates timing offset and estimates the power level of the received preamble and sends a Random Access Response (RAR) to the UE which contains a timing advance (TA) command and an uplink grant. The uplink grant indicates the PUSCH resource and the power adjustment that the UE can use. The TA command signals the timing advance to apply to the PUSCH.

As those familiar with 3GPP standards will appreciate there are also more complicated procedures than the ones described above. When the UE does not currently have an RRC connection, the UE undertakes a PRACH procedure, such as that described above in reference to FIG. 4. As illustrated by the message flow diagram in FIG. 4, the RAR sent by the eNodeB in step S42 in response to the PRACH sent in step S41 allocates some timing advanced and power controlled PUSCH resources for the UE to send a Message 3, where the Message 3 can either allow the UE to form an RRC connection with the network or can allow the UE to send uplink data directly using EDT.

In Release-15 and prior to Release-15, it is known that the UE can use preconfigured resources. The UE can use these PUR without having to receive an explicit grant from the UE to use any one instance of those grant free resources. Examples of the UE using PUR include:

Semi-persistent scheduling (SPS) in LTE. A UE is allocated (via RRC signalling) some PUSCH resources that it can use for a defined period of time (i.e. the PUSCH resources are semi-statically assigned to the UE). An example SPS allocation would be that the UE can use some assigned PRBs (physical resource blocks) for PUSCH in every Nth subframe (e.g. N=16);

Uplink grant-free resources in NR. This is similar to SPS in LTE. The UE can use semi-statically assigned PUSCH resources. Release-15 supports the UE using orthogonal resources for PUSCH (one implication being that the PUSCH transmission from the UE is timing advanced); and There are ongoing discussions about the UE being able to use non-orthogonal resources (NOMA) for the uplink transmissions in NR, where the PUSCH resources would use a waveform that does not require correct timing between the UE and eNodeB.

In the above example, timing advance is provided to the UE according to a conventional arrangement. For the example of SPS, when there is a timing offset between the UE and eNodeB, the eNodeB sends a timing advance command to the UE such that the next time the UE sends a PUSCH to the eNodeB, that next PUSCH is correctly timing advanced.

Note that in the above examples of PUR, the eNodeB determines whether to assign SPS (or uplink grant free) resources to UEs such that different UEs have unique and non-overlapping resources, or whether to assign overlapping resources. When there are overlapping resources, the eNodeB needs to handle the case where there are collisions in uplink transmissions (where two UEs choose to use the same overlapping resource at the same time).

A UE may transmit infrequently to the eNodeB (for example, it may send a meter reading report every 24 hours to the eNodeB). In such cases, the timing advance value of the UE may be incorrect between reports (for example when the UE has moved location). The procedure to correct the timing advance between the UE and eNodeB is fairly onerous, involving executing a PRACH procedure.

Timing advance is one example of a transmission parameter with which signals transmitted by a UE should be adjusted in order for the signals can be received at the eNodeB when the eNodeB is configured to detect those signals successfully to communicate data. Timing advance needs to be corrected if there is a mismatch between the timing of the UE and that of the eNodeB, which is typically caused by a propagation delay of the signals in transit. This timing mismatch can occur either in idle mode or connected mode. In connected mode, a timing mismatch can occur when the DRX cycle is long (such that the UE infrequently transmits PUSCH and infrequently receives timing advance commands). In idle mode, the time between timing advance commands can be long, leading to a timing mismatch between the UE and eNodeB.

Typically, at the application layer, when a device transmits a packet such as a report to a server, the server would response with an acknowledgement (or further instructions). That is, a device at the application layer would expect an application layer message such as an acknowledgement in the downlink after transmitting an uplink message. However, once an uplink message using either PUR or EDT is transmitted, the UE is expected to go back into idle mode and when the application layer acknowledgement in the downlink arrives, the network have to wait for the next Paging Occasion (PO) to transmit this downlink message. For IoT devices, the PO can be configured to be very long, e.g. every 24 hours. The application layer may time-out waiting for an application layer acknowledgement in the downlink, and thus may retransmit the uplink message thereby wasting power. Embodiments of the present disclosure relate to methods and apparatus which are able to solve this issue.

Dynamic Sub-Paging Occasions for A-MTC

Figure 6:
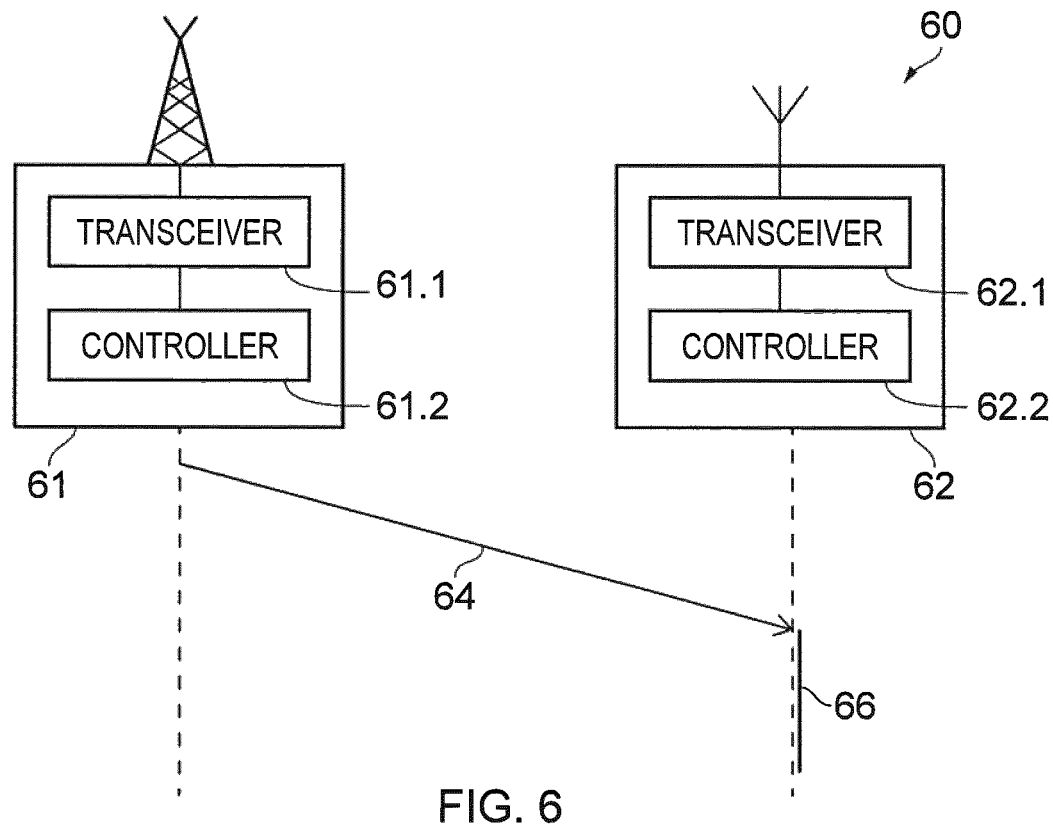
FIG. 6 shows a part schematic, part message flow diagram representation of a wireless communications network comprising an infrastructure equipment and a communications device in accordance with embodiments of the present technique.

FIG. 6 shows a part schematic, part message flow diagram representation of a wireless communications network 60 comprising an infrastructure equipment 61 and a communications device 62 in accordance with embodiments of the present technique. The communications device 62 is configured to transmit user plane data to the wireless communications network 60 (e.g. to the infrastructure equipment 61) via a wireless access interface provided by a cell of the wireless communications network 60 when the communications device 62 is not in an active radio resource connected mode.

The infrastructure equipment 61 and the communications device 62 each comprise a transceiver (or transceiver circuitry) 61.1, 62.1 and a controller (or controller circuitry) 61.2, 62.2. Each of the controllers 61.2, 62.2 may be, for example, a microprocessor, a CPU, or a dedicated chipset, etc.

The transceiver circuitry 62.1 and the controller circuitry 62.2 of the communications device 62 are configured in combination to transmit 64 the user plane data (e.g. to the infrastructure equipment 61) using one of a preconfigured set of uplink radio resources of the wireless access interface and a scheduled random access procedure message, and to monitor 66 a preconfigured set of downlink radio resources of the wireless access interface for a downlink signal (e.g. from the infrastructure equipment 61), the preconfigured set of downlink radio resources being provided in response to the transmitted user plane data 64.

The communications device 62 may then be configured to receive the downlink signal in the preconfigured set of downlink radio resources. This downlink signal may be, for example, an application layer acknowledgement of the transmitted user plane data 64, or may be an application layer downlink message comprising data for the communications device 62 in response to and in accordance with the transmitted user plane data.

As described above, the user plane data may be transmitted 64 by the communications device 62 using one of a preconfigured set of uplink radio resources of the wireless access interface and a scheduled random access procedure message. When the user plane data is transmitted using the preconfigured set of uplink radio resources (i.e. the user plane data is transmitted as a PUR transmission), the communications device 62 is configured to transmit the user plane data (e.g. to the infrastructure equipment 61) using the preconfigured set of uplink radio resources in advance of receiving any signalling information comprising an indication of radio resources in which the user plane data can be transmitted (i.e. without having first received an uplink grant). When the user plane data is transmitted using the scheduled random access procedure message, the communications device 62 is configured to transmit, using a first message of a random access procedure, one of a reserved set of preambles (e.g. to the infrastructure equipment 62), the preambles of the reserved set indicating that the communications device 62 has the user plane data to transmit, to receive, using a second message of the random access procedure, an indication of radio resources in which the user plane data can be transmitted (e.g. from the infrastructure equipment 62), the radio resources in which the user plane data can be transmitted forming at least a part of the scheduled random access procedure message, and to transmit (e.g. to the infrastructure equipment 62) the scheduled random access procedure message in the indicated radio resources, the scheduled random access procedure message being a third message of the random access procedure. Here, the user plane data is transmitted as an uplink EDT.

Essentially, embodiments of the present technique define ways in which a "downlink transmission opportunity" may be provided after an uplink data transmission from a communications device which is in a non-connected mode (i.e. idle mode). This uplink data transmission can be performed using PUR or uplink EDT over message 3.

Figure 7:
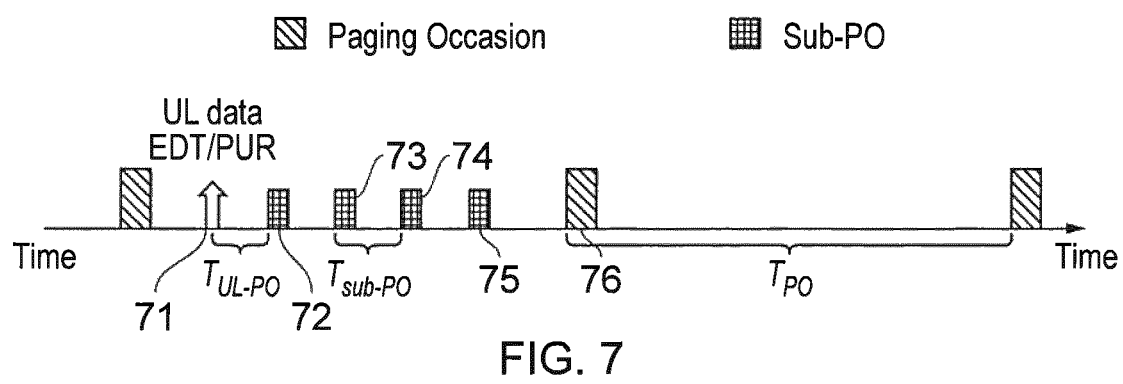
FIG. 7 illustrates an example of using sub-Paging Occasion (PO) monitoring periods for downlink transmissions in accordance with embodiments of the present technique.

In an arrangement of embodiments of the present technique, the said downlink transmission opportunity is at least one sub-Paging Occasion (sub-PO). This sub-PO is a paging occasion that has a PO period $T_{sub-PO}$ that is shorter than the UE's conventional PO, $T_{PO}$. The number of sub-PO $N_{sub-PO}$ and sub-PO period $T_{sub-PO}$ can be indicated in the System Information Blocks (SIBs), UE specific configured in connected mode, UE specific configured dynamically during one of the RRC messages (e.g. Msg2 or Msg4) or specified in the specifications. An example is shown in FIG. 7, where a UE transmits an UL data 71 using either EDT or PUR and instead of waiting $T_{PO}$ for the next PO 76 (which can be 24 hours later), the UE is given $N_{sub-PO}$=4 sub-PO 72, 73, 74, 75 with a periodicity of $T_{sub-PO}$ where the first sub-PO starts T Po after the UL data transmission. The network can therefore transmit an application layer acknowledgement (or any corresponding application layer downlink message) to the UE during one of these 4 sub-POs 72, 73, 74, 75. This downlink message can be transmitted in the form of a DL EDT (e.g. using the paging message [10], Msg 2 [11] or Msg 4) or request for a RRC Connection to transmit the downlink message. After the UE finishes monitoring the $N_{sub-PO}$ sub-POs, it then resumes its normal PO cycle, i.e. monitor a PO every $T_{PO}$ in the example in FIG. 7. In other words, in this arrangement, the preconfigured set of downlink radio resources comprises one or more temporally spaced sub-Paging Occasions, PO, a sub-PO having a period of less than a period of a conventional PO.

Figure 8:
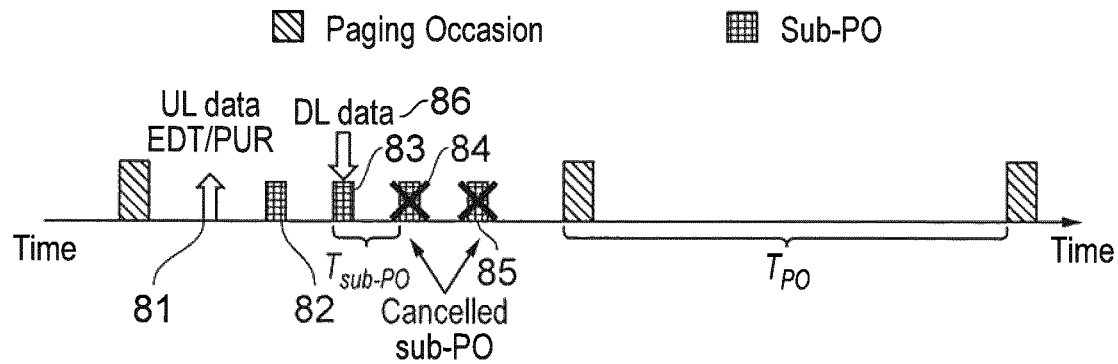
FIG. 8 illustrates an example of cancelling sub-PO monitoring periods for downlink transmissions in accordance with embodiments of the present technique.

In an arrangement of embodiments of the present technique, the UE stops monitoring the remaining sub-POs if a sub-PO has a downlink transmission to the UE. For example in FIG. 8, four sub-POs 82, 83, 84, 85 are provided for the UE that has transmitted an UL data 81 using EDT/PUR. The UE then receives a DL data 86 at the $2^{nd}$ sub-PO and using this arrangement, the UE does not need to monitor the remaining two sub-Pos 84, 85 thereby allowing it to go back to sleep. In other words, in this arrangement, the communications device is configured to receive (e.g. from the infrastructure equipment) the downlink signal in one of the sub-POs, and to stop the monitoring of one or more sub-POs located later in time to the sub-PO in which the downlink signal is received. This arrangement is particularly useful if the application layer only sends a single acknowledgement.

Figure 9:
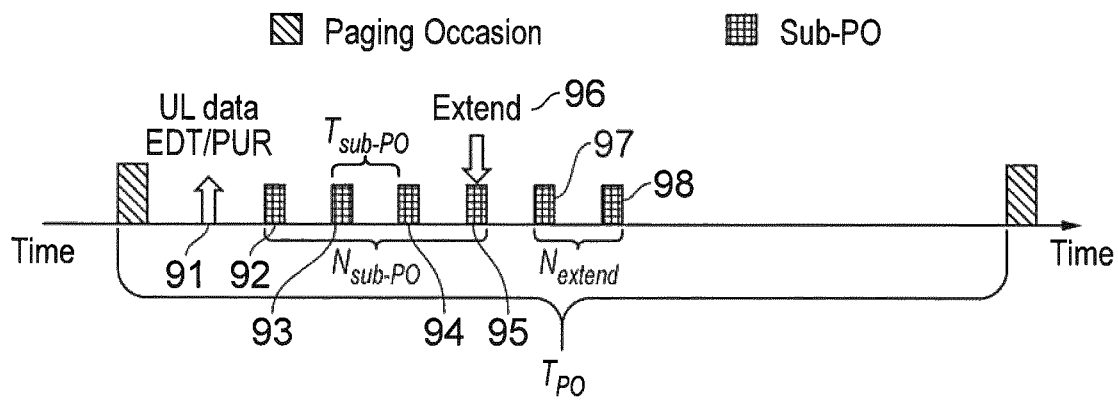
FIG. 9 illustrates an example of extending sub-PO monitoring periods for downlink transmissions in accordance with embodiments of the present technique.

In an arrangement of embodiments of the present technique, the network can indicate to the UE to extend the sub-PO by $N_{extend}$. The number of $N_{extend}$ be explicitly indicated in this said indicator or predetermined, e.g. $N_{extend} = k \times N_{sub-PO}$, i.e. a known function of $N_{sub-PO}$. An example is shown in FIG. 9, where the UE is provided with $N_{sub-PO} = 4$ sub-POs 92, 93, 94, 95 after its UL data transmission 91 using EDT/PUR. At the last sub-PO 95 the network sends an indication 96 to extend the sub-POs by $N_{extend} = 2$, such that the UE is now also provided with sub-POs 97 and 98. In other words, in this arrangement, the communications device is configured to receive (e.g. from the infrastructure equipment) an indication that the communications device should monitor one or more further sub POs located later in time to the one or more sub POs of the preconfigured set of downlink radio resources. This arrangement is beneficial if the server needs additional time to provide the application layer message to the device or the eNodeB received the application layer message but unable to schedule the message to the UE. This said indicator can be signalled using a DCI via an MPDCCH in the common search space for paging or using a DL EDT.

In an arrangement of embodiments of the present technique, the sub-PO is cancelled when the UE reselects to another cell. That is the UE stops monitoring for sub-PO when it moves into a new cell before/$V_{sub-PO}$ sub-POs have been monitored. In other words, in this arrangement, the communications device is configured to perform a cell reselection procedure to a new cell such that the communications device is served by (an infrastructure equipment of) the new cell of the wireless communications network, and to stop the monitoring of the one or more sub-POs subsequent to the performing reselection procedure to the new cell.

In an arrangement of embodiments of the present technique, the eNodeB can indicate whether it supports sub-PO and if it does, a UE that is configured with a sub-PO in a previous cell where the sub-PO has not expire yet, the UE will continue to monitor the remaining sub-PO in the new cell using the parameters in the new cell. In other words, in this arrangement, the communications device is configured to perform a cell reselection procedure to a new cell such that the communications device is served by (an infrastructure equipment of) the new cell of the wireless communications network, to receive an indication from the new cell that the new cell supports the use of sub-POs, and to monitor, in the new cell, one or more remaining sub-POs of the preconfigured set of downlink radio resources.

Figure 10:
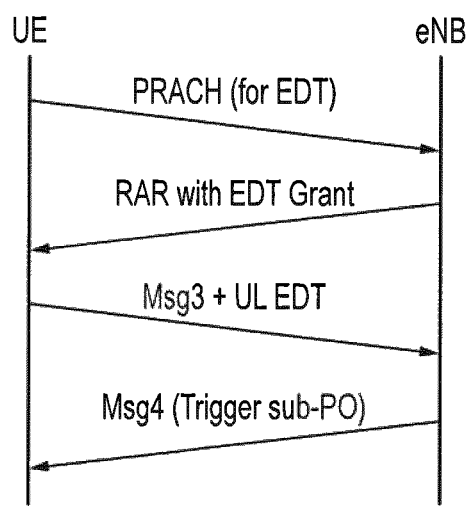
FIG. 10 shows an example message flow diagram representation of the triggering of sub-POs in accordance with embodiments of the present technique.

In an arrangement of embodiments of the present technique, the sub-PO is triggered by the network after the UE has transmitted the UL data. If the UE uses PUR, the sub-PO is triggered using Msg2 or Msg4. If the UE uses UL EDT via Msg3, the sub-PO is triggered using Msg4. An example is shown in FIG. 10, where the UE transmits a PRACH using a set of preambles that indicate a request for UL EDT. The eNodeB sends a RAR with an UL grant for the UE's uplink data and the UE uses this UL grant to transmit its UL data via Msg3. Msg4 resolves any contention resolution, signals to the UE to go to sleep and in this arrangement, it also triggers for the UE to monitor for sub-PO. This trigger can also provide sub-PO configurations, such as number of sub-POs $N_{sub-PO}$ and periodicity $T_{sub-PO}$. In other words, in this arrangement, the communications device is configured to receive (e.g. from the infrastructure equipment) an indication that the communications device should monitor the one or more sub POs of the preconfigured set of downlink radio resources, the indication being received in a downlink message of a message exchange subsequent to an uplink message of the message exchange comprising the transmitted user plane data. It should be noted that the example of FIG. 10 shows the use of Msg4 to trigger the sub-PO, although the triggering of sub-POs could be equally achieved using Msg2.

Figure 11:
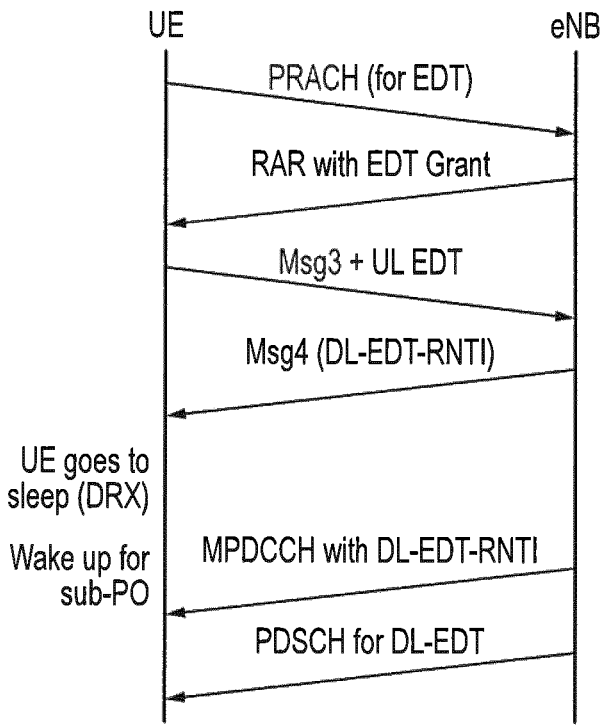
FIG. 11 shows an example message flow diagram representation of the transmission of a downlink Early Data Transmission (EDT) in accordance with embodiments of the present technique.

In an arrangement of embodiments of the present technique, after transmitting an UL data via EDT/PUR the UE is provided with an RNTI in either Msg2 (if PUR is used) or Msg4 (if PUR or UL EDT via Msg3 is used). This said RNTI, e.g. DL-EDT-RNTI is used for monitoring for a DCI during the sub-PO (or conventional PO) for a DL grant. An example signalling diagram is shown in FIG. 11, where here the UE performs an UL EDT via Msg3 by using a reserved set of PRACH and receiving an UL grant from the RAR. The UE then transmits the UL EDT via Msg3. Before signalling the UE to go to sleep, in this arrangement, Msg4 would also provide the UE with the said DL-EDT-RNTI. In the sub-POs the UE monitors the MPDCCH using DL-EDT-RNTI (and other RNTI such as P-RNTI for regular paging) and if it detects an MPDCCH with DL-EDT-RNTI, it would then receive a downlink data in the corresponding PDSCH. The DL-EDT can carry the downlink application layer acknowledgement for the UE. In other words, in this arrangement, the communications device is configured to receive (e.g. from the infrastructure equipment) an indication of a unique identifier associated with the communications device, the indication being received in a downlink message of a message exchange subsequent to an uplink message of the message exchange comprising the transmitted user plane data, and to monitor the preconfigured set of downlink radio resources for signalling information comprising the unique identifier, the signalling information indicating a location of radio resources scheduled for the transmission of the downlink signal in the preconfigured set of downlink resources. It should be noted that arrangement is also applicable if the UE transmits the uplink data using PUR. If sub-POs are not configured, this DL-EDT-RNTI can be used on regular POs.

In an arrangement of embodiments of the present technique, a timer is started when the said DL-EDT-RNTI is configured for the UE. Once the timer expires, the UE will stop using the DL-EDT-RNTI to monitor for downlink grants. In other words, in this arrangement, the communications device is configured to receive (e.g. from the infrastructure equipment) an indication of a timer, the timer being started upon configuration of the unique identifier, to determine that the timer has expired, and to determine that the communications device is no longer associated with the unique identifier subsequent to the expiry of the timer. The network may configure the timer in signalling information sent to the communications device, where the signalling information indicates that that the communications device should stop using the DL-EDT-RNTI to monitor for downlink grants after the timer has expired, or the communications device may determine that a timer should be started on reception of a DL-EDT-RNTI from the network by itself, based on predefined behaviour (i.e. in the specifications).

In an arrangement of embodiments of the present technique, the UE stops using DL-EDT-RNTI when it stops monitoring sub-POs. The UE can stop monitoring for sub-POs using any of the previously described arrangements. In other words, in this arrangement, the communications device is configured to stop the monitoring of the preconfigured set of downlink radio resources, and to determine that the communications the communications device is no longer associated with the unique identifier subsequent to the stopping of the monitoring of the preconfigured set of downlink radio resources. The network may indicate to the communications device that it should stop using the DL-EDT-RNTI to monitor for downlink grants after it has stopped monitoring the sub-POs, or the communications device may determine so itself.

Figure 12:
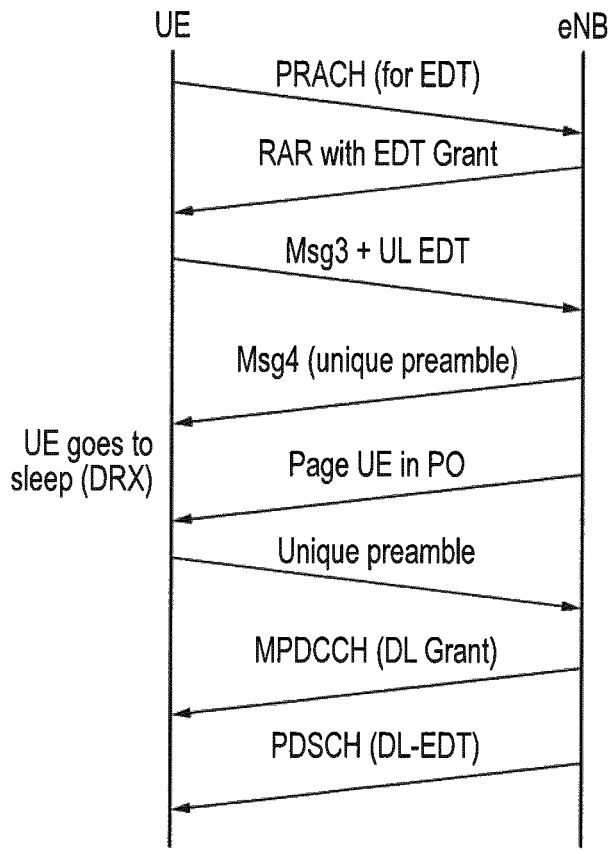
FIG. 12 shows an example message flow diagram representation of configuring unique preambles for communications devices for the reception of a downlink EDT transmission in accordance with embodiments of the present technique.

In an arrangement of embodiments of the present technique, the UE is provided with a unique preamble after it has transmitted its UL data using PUR/UL EDT. An example signalling diagram is shown by FIG. 12. This said unique preamble can be provided in Msg2 or Msg4 if PUR is used or in Msg4 if UL EDT via Msg3 is used. If the UE is paged during a sub-PO, the UE will response with this unique preamble. This allows the eNodeB to recognise this UE and thereby provide this UE with a DL-EDT that contains the downlink application layer data. The unique preamble is to enable the UE to identify itself to the eNodeB since the UE may have moved cell. In other words, in this arrangement, the communications device is configured to receive (e.g. from the infrastructure equipment) an indication of a unique preamble signal associated with the communications device, the indication being received in a downlink message of a message exchange subsequent to an uplink message of the message exchange comprising the transmitted user plane data, to receive (e.g. from the infrastructure equipment) a paging message in the preconfigured set of downlink radio resources, to transmit (e.g. to the infrastructure equipment) a signal comprising the unique preamble in response to the received paging message, and to receive (e.g. from the infrastructure equipment) the downlink data in the preconfigured set of downlink resources subsequent to transmitting the signal comprising the unique preamble. As above, this arrangement can also be used even if sub-PO is not configured.

Figure 13:
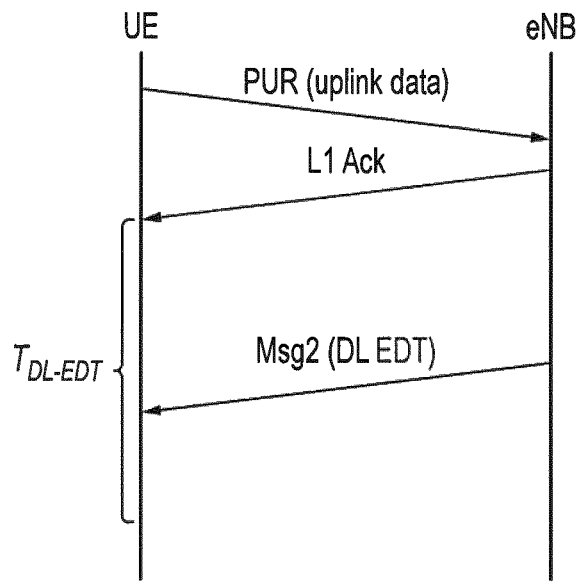
FIG. 13 shows an example message flow diagram representation of using a time window in order to receive downlink transmissions in accordance with embodiments of the present technique.

In an arrangement of embodiments of the present technique, a time window $T_{DL-EDT}$ is introduced after the UE transmits an uplink transmission using PUR or UL-EDT where within this time window the UE monitors for a DL-EDT. This recognises that the application layer requires some time to provide a downlink application acknowledgement/data after receiving an uplink data. The DL-EDT can be transmitted using Msg2 or Msg4 if the uplink data is transmitted using PUR. The DL-EDT is transmitted using Msg4 is the uplink data is transmitted using Msg3 UL EDT. An example of such signalling is shown in FIG. 13 where the UE transmits an uplink data using PUR. The UE then receives a layer 1 acknowledgement (e.g. in the form of DCI). The UE then monitors for a DL EDT, in this case via Msg2, within the time window $T_{DL-EDT}$ to receive downlink data from the application layer. In other words, in this arrangement, the preconfigured set of downlink radio resources are located within a time window, the time window defining a time period over which the preconfigured set of downlink radio resources extend. The communications device, in this arrangement, is configured to receive (from the infrastructure equipment) a physical layer acknowledgement of the transmitted uplink data in a downlink message of a message exchange subsequent to an uplink message of the message exchange comprising the transmitted user plane data, wherein the time window comprising the preconfigured set of downlink radio resources begins at the time at which the physical layer acknowledgement is received.

Flow Chart Representation

Figure 14:
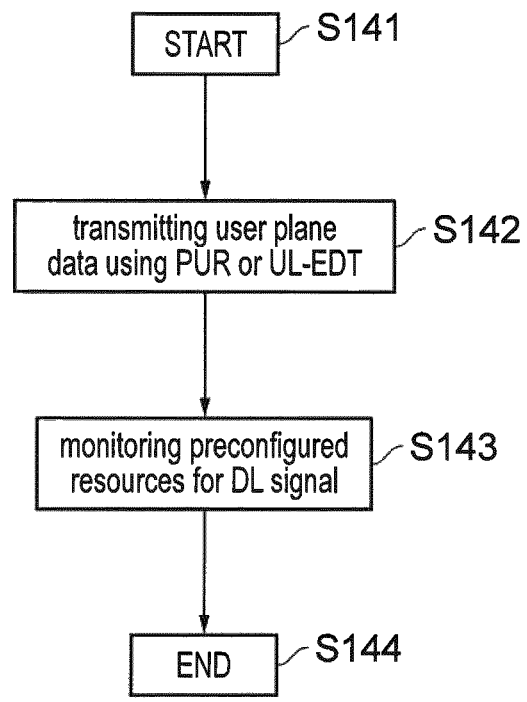
FIG. 14 is a flow diagram representation of a method of operating a communications device according to embodiments of the present technique.

FIG. 14 shows a flow diagram illustrating a method of operating a communications device for transmitting user plane data to a wireless communications network via a wireless access interface provided by a cell of the wireless communications network when the communications device is not in an active radio resource connected mode.

The method begins in step S141. The method comprises, in step S142, transmitting the user plane data using one of a preconfigured set of uplink radio resources of the wireless access interface and a scheduled random access procedure message. In step S143, the process comprises monitoring a preconfigured set of downlink radio resources of the wireless access interface for a downlink signal, the preconfigured set of downlink radio resources being provided in response to the transmitted user plane data. The process ends in step S144.

Those skilled in the art would appreciate that the method shown by FIG. 14 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device for transmitting user plane data to a wireless communications network via a wireless access interface provided by a cell of the wireless communications network when the communications device is not in an active radio resource connected mode, the method comprising transmitting the user plane data using one of a preconfigured set of uplink radio resources of the wireless access interface and a scheduled random access procedure message, and monitoring a preconfigured set of downlink radio resources of the wireless access interface for a downlink signal, the preconfigured set of downlink radio resources being provided in response to the transmitted user plane data.

Paragraph 2. A method according to Paragraph 1, comprising receiving the downlink signal in the preconfigured set of downlink radio resources.

Paragraph 3. A method according to Paragraph 1 or Paragraph 2, wherein the downlink signal comprises an application layer acknowledgement of the transmitted user plane data.

Paragraph 4. A method according to any of Paragraphs 1 to 3, wherein the downlink signal comprises an application layer downlink message comprising data for the communications device in response to and in accordance with the transmitted user plane data.

Paragraph 5. A method according to any of Paragraphs 1 to 4, wherein when the user plane data is transmitted using the preconfigured set of uplink radio resources, the method comprises transmitting the user plane data using the preconfigured set of uplink radio resources in advance of receiving any signalling information comprising an indication of radio resources in which the user plane data can be transmitted.

Paragraph 6. A method according to any of Paragraphs 1 to 5, wherein when the user plane data is transmitted using the scheduled random access procedure message, the method comprises
  transmitting, using a first message of a random access procedure, one of a reserved set of preambles, the preambles of the reserved set indicating that the communications device has the user plane data to transmit,
  receiving, using a second message of the random access procedure, an indication of radio resources in which the user plane data can be transmitted, the radio resources in which the user plane data can be transmitted forming at least a part of the scheduled random access procedure message, and
  transmitting the scheduled random access procedure message in the indicated radio resources, the scheduled random access procedure message being a third message of the random access procedure.

Paragraph 7. A method according to any of Paragraphs 1 to 6, wherein the preconfigured set of downlink radio resources comprises one or more temporally spaced sub-Paging Occasions, PO, a sub-PO having a period of less than a period of a conventional PO.

Paragraph 8. A method according to Paragraph 7, comprising
  receiving the downlink signal in one of the sub-POs, and
  stopping the monitoring of one or more sub-POs located later in time to the sub-PO in which the downlink signal is received.

Paragraph 9. A method according to Paragraph 7 or Paragraph 8, comprising
  receiving an indication that the communications device should monitor one or more further sub POs located later in time to the one or more sub POs of the preconfigured set of downlink radio resources.

Paragraph 10. A method according to any of Paragraphs 7 to 9, comprising
  performing a reselection procedure to a new cell such that the communications device is served by the new cell of the wireless communications network, and
  stopping the monitoring of the one or more sub-POs subsequent to the performing reselection procedure to the new cell.

Paragraph 11. A method according to any of Paragraphs 7 to 10, comprising
  performing a reselection procedure to a new cell such that the communications device is served by the new cell of the wireless communications network,
  receiving an indication from the new cell that the new cell supports the use of sub-POs, and
  monitoring, in the new cell, one or more remaining sub-POs of the preconfigured set of downlink radio resources.

Paragraph 12. A method according to any of Paragraphs 7 to 11, comprising
  receiving an indication that the communications device should monitor the one or more sub POs of the preconfigured set of downlink radio resources, the indication being received in a downlink message of a message exchange subsequent to an uplink message of the message exchange comprising the transmitted user plane data.

Paragraph 13. A method according to any of Paragraphs 1 to 12, comprising
  receiving an indication of a unique identifier associated with the communications device, the indication being received in a downlink message of a message exchange subsequent to an uplink message of the message exchange comprising the transmitted user plane data, and
  monitoring the preconfigured set of downlink radio resources for signalling information comprising the unique identifier, the signalling information indicating a location of radio resources scheduled for the transmission of the downlink signal in the preconfigured set of downlink resources.

Paragraph 14. A method according to Paragraph 13,
  receiving an indication of a timer, the timer being started upon configuration of the unique identifier,
  determining that the timer has expired, and
  determining that the communications device is no longer associated with the unique identifier subsequent to the expiry of the timer.

Paragraph 15. A method according to Paragraph 13 or Paragraph 14, comprising
  stopping the monitoring of the preconfigured set of downlink radio resources, and
  determining that the communications the communications device is no longer associated with the unique identifier subsequent to the stopping of the monitoring of the preconfigured set of downlink radio resources.

Paragraph 16. A method according to any of Paragraphs 1 to 15, comprising
  receiving an indication of a unique preamble signal associated with the communications device, the indication being received in a downlink message of a message exchange subsequent to an uplink message of the message exchange comprising the transmitted user plane data,
  receiving a paging message in the preconfigured set of downlink radio resources,
  transmitting a signal comprising the unique preamble in response to the received paging message, and
  receiving the downlink data in the preconfigured set of downlink resources subsequent to transmitting the signal comprising the unique preamble.

Paragraph 17. A method according to any of Paragraphs 1 to 16, wherein the preconfigured set of downlink radio resources are located within a time window, the time window defining a time period over which the preconfigured set of downlink radio resources extend.

Paragraph 18. A method according to Paragraph 17, comprising
  receiving a physical layer acknowledgement of the transmitted uplink data in a downlink message of a message exchange subsequent to an uplink message of the message exchange comprising the transmitted user plane data,
  wherein the time window comprising the preconfigured set of downlink radio resources begins at the time at which the physical layer acknowledgement is received.

Paragraph 19. A communications device for transmitting user plane data to a wireless communications network via a wireless access interface provided by a cell of the wireless communications network when the communications device is not in an active radio resource connected mode, the communications device comprising transceiver circuitry and controller circuitry configured in combination
- to transmit the user plane data using one of a preconfigured set of uplink radio resources of the wireless access interface and a scheduled random access procedure message, and
- to monitor a preconfigured set of downlink radio resources of the wireless access interface for a downlink signal, the preconfigured set of downlink radio resources being provided in response to the transmitted user plane data.

Paragraph 20. Circuitry for a communications device for transmitting user plane data to a wireless communications network via a wireless access interface provided by a cell of the wireless communications network when the communications device is not in an active radio resource connected mode, the communications device comprising transceiver circuitry and controller circuitry configured in combination
- to transmit the user plane data using one of a preconfigured set of uplink radio resources of the wireless access interface and a scheduled random access procedure message, and
- to monitor a preconfigured set of downlink radio resources of the wireless access interface for a downlink signal, the preconfigured set of downlink radio resources being provided in response to the transmitted user plane data.

Paragraph 21. A method of operating an infrastructure equipment forming part of a wireless communications network for receiving user plane data from a communications device via a wireless access interface provided by the infrastructure equipment when the communications device is not in an active radio resource connected mode, the method comprising
- receiving the user plane data in one of a preconfigured set of uplink radio resources of the wireless access interface and a scheduled random access procedure message, and
- determining that a downlink signal can be transmitted in response to the received user plane data within a preconfigured set of downlink radio resources of the wireless access interface, the preconfigured set of downlink radio resources being provided in response to the transmitted user plane data.

Paragraph 22. A method according to Paragraph 21, comprising
- transmitting the downlink signal in the preconfigured set of downlink radio resources.

Paragraph 23. An infrastructure equipment forming part of a wireless communications network for receiving user plane data from a communications device via a wireless access interface provided by the infrastructure equipment when the communications device is not in an active radio resource connected mode, the infrastructure equipment comprising transceiver circuitry and controller circuitry configured in combination
- to receive the user plane data in one of a preconfigured set of uplink radio resources of the wireless access interface and a scheduled random access procedure message, and
- to determine that a downlink signal can be transmitted in response to the received user plane data within a preconfigured set of downlink radio resources of the wireless access interface, the preconfigured set of downlink radio resources being provided in response to the transmitted user plane data.

Paragraph 24. Circuitry for an infrastructure equipment forming part of a wireless communications network for receiving user plane data from a communications device via a wireless access interface provided by the infrastructure equipment when the communications device is not in an active radio resource connected mode, the infrastructure equipment comprising transceiver circuitry and controller circuitry configured in combination
- to receive the user plane data in one of a preconfigured set of uplink radio resources of the wireless access interface and a scheduled random access procedure message, and
- to determine that a downlink signal can be transmitted in response to the received user plane data within a preconfigured set of downlink radio resources of the wireless access interface, the preconfigured set of downlink radio resources being provided in response to the transmitted user plane data.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] RP-181450, "New WID on Rel-16 MTC enhancements for LTE," Ericsson, 3GPP TSG RAN Meeting #80, La Jolla, USA, Jun. 11-14, 2018.
[6] RP-181451, "New WID on Rel-16 enhancements for NB-IoT," Ericsson, Huawei, 3GPP TSG RAN Meeting #80, La Jolla, USA, Jun. 11-14, 2018.
[7] Holma H. and Toskala A, "LTE for UMTS OFDMA and SC-FDMA based radio access", John Wiley and Sons, 2009.
[8] 3GPP TS 36.304, "Evolved Universal Terrestrial Radio Access (E-UTRA); User Equipment (UE) procedures in idle mode", 3rd Generation Partnership Project.
[9] 3GPP TS 36.321, "Evolved Universal Terrestrial Radio Access (E-UTRA); Medium Access Control (MAC) protocol specification", 3rd Generation Partnership Project.
[10] International Patent Application number PCT/EP2017/069003, Sony Corporation et al.
[11] International Patent Application number PCT/EP2017/080828, Sony Corporation et al.

What is claimed is:

1. A method of operating a communications device for transmitting user plane data to a wireless communications network via a wireless access interface provided by a cell of the wireless communications network when the communications device is not in an active radio resource connected mode, the method comprising
    transmitting the user plane data using one of a preconfigured set of uplink radio resources of the wireless access interface and a scheduled random access procedure message, and
    monitoring a preconfigured set of downlink radio resources of the wireless access interface for a downlink signal, the preconfigured set of downlink radio resources being provided in response to the transmitted user plane data.

2. A method according to claim 1, comprising
    receiving the downlink signal in the preconfigured set of downlink radio resources.

3. A method according to claim 1, wherein the downlink signal comprises an application layer acknowledgement of the transmitted user plane data.

4. A method according to claim 1, wherein the downlink signal comprises an application layer downlink message comprising data for the communications device in response to and in accordance with the transmitted user plane data.

5. A method according to claim 1, wherein when the user plane data is transmitted using the preconfigured set of uplink radio resources, the method comprises
    transmitting the user plane data using the preconfigured set of uplink radio resources in advance of receiving any signalling information comprising an indication of radio resources in which the user plane data can be transmitted.

6. A method according to claim 1, wherein when the user plane data is transmitted using the scheduled random access procedure message, the method comprises
    transmitting, using a first message of a random access procedure, one of a reserved set of preambles, the preambles of the reserved set indicating that the communications device has the user plane data to transmit,
    receiving, using a second message of the random access procedure, an indication of radio resources in which the user plane data can be transmitted, the radio resources in which the user plane data can be transmitted forming at least a part of the scheduled random access procedure message, and
    transmitting the scheduled random access procedure message in the indicated radio resources, the scheduled random access procedure message being a third message of the random access procedure.

7. A method according to claim 1, wherein the preconfigured set of downlink radio resources comprises one or more temporally spaced sub-Paging Occasions, PO, a sub-PO having a period of less than a period of a conventional PO.

8. A method according to claim 7, comprising
    receiving the downlink signal in one of the sub-POs, and
    stopping the monitoring of one or more sub-POs located later in time to the sub-PO in which the downlink signal is received.

9. A method according to claim 7, comprising
    receiving an indication that the communications device should monitor one or more further sub POs located later in time to the one or more sub POs of the preconfigured set of downlink radio resources.

10. A method according to claim 7, comprising
    performing a reselection procedure to a new cell such that the communications device is served by the new cell of the wireless communications network, and
    stopping the monitoring of the one or more sub-POs subsequent to the performing reselection procedure to the new cell.

11. A method according to claim 7, comprising
    performing a reselection procedure to a new cell such that the communications device is served by the new cell of the wireless communications network,
    receiving an indication from the new cell that the new cell supports the use of sub-POs, and
    monitoring, in the new cell, one or more remaining sub-POs of the preconfigured set of downlink radio resources.

12. A method according to claim 7, comprising
    receiving an indication that the communications device should monitor the one or more sub POs of the preconfigured set of downlink radio resources, the indication being received in a downlink message of a message exchange subsequent to an uplink message of the message exchange comprising the transmitted user plane data.

13. A method according to claim 1, comprising
    receiving an indication of a unique identifier associated with the communications device, the indication being received in a downlink message of a message exchange subsequent to an uplink message of the message exchange comprising the transmitted user plane data, and
    monitoring the preconfigured set of downlink radio resources for signalling information comprising the unique identifier, the signalling information indicating a location of radio resources scheduled for the transmission of the downlink signal in the preconfigured set of downlink resources.

14. A method according to claim 13,
    receiving an indication of a timer, the timer being started upon configuration of the unique identifier,
    determining that the timer has expired, and determining that the communications device is no longer associated with the unique identifier subsequent to the expiry of the timer.

15. A method according to claim 13, comprising stopping the monitoring of the preconfigured set of downlink radio resources, and
determining that the communications device is no longer associated with the unique identifier subsequent to the stopping of the monitoring of the preconfigured set of downlink radio resources.

16. A method according to claim 1, comprising
receiving an indication of a unique preamble signal associated with the communications device, the indication being received in a downlink message of a message exchange subsequent to an uplink message of the message exchange comprising the transmitted user plane data,
receiving a paging message in the preconfigured set of downlink radio resources,
transmitting a signal comprising the unique preamble in response to the received paging message, and
receiving the downlink data in the preconfigured set of downlink resources subsequent to transmitting the signal comprising the unique preamble.

17. A method according to claim 1, wherein the preconfigured set of downlink radio resources are located within a time window, the time window defining a time period over which the preconfigured set of downlink radio resources extend.

18. A method according to claim 17, comprising
receiving a physical layer acknowledgement of the transmitted uplink data in a downlink message of a message exchange subsequent to an uplink message of the message exchange comprising the transmitted user plane data,
wherein the time window comprising the preconfigured set of downlink radio resources begins at the time at which the physical layer acknowledgement is received.

19. A communications device for transmitting user plane data to a wireless communications network via a wireless access interface provided by a cell of the wireless communications network when the communications device is not in an active radio resource connected mode, the communications device comprising transceiver circuitry and controller circuitry configured in combination
to transmit the user plane data using one of a preconfigured set of uplink radio resources of the wireless access interface and a scheduled random access procedure message, and
to monitor a preconfigured set of downlink radio resources of the wireless access interface for a downlink signal, the preconfigured set of downlink radio resources being provided in response to the transmitted user plane data.

20. Circuitry for a communications device for transmitting user plane data to a wireless communications network via a wireless access interface provided by a cell of the wireless communications network when the communications device is not in an active radio resource connected mode, the circuitry comprising transceiver circuitry and controller circuitry configured in combination
to transmit the user plane data using one of a preconfigured set of uplink radio resources of the wireless access interface and a scheduled random access procedure message, and
to monitor a preconfigured set of downlink radio resources of the wireless access interface for a downlink signal, the preconfigured set of downlink radio resources being provided in response to the transmitted user plane data.

\* \* \* \* \*